G. C. DAVISON.
AUTOMOBILE TORPEDO.
APPLICATION FILED MAR. 19, 1908. RENEWED JULY 3, 1912.
1,036,082.
Patented Aug. 20, 1912.
5 SHEETS—SHEET 1.
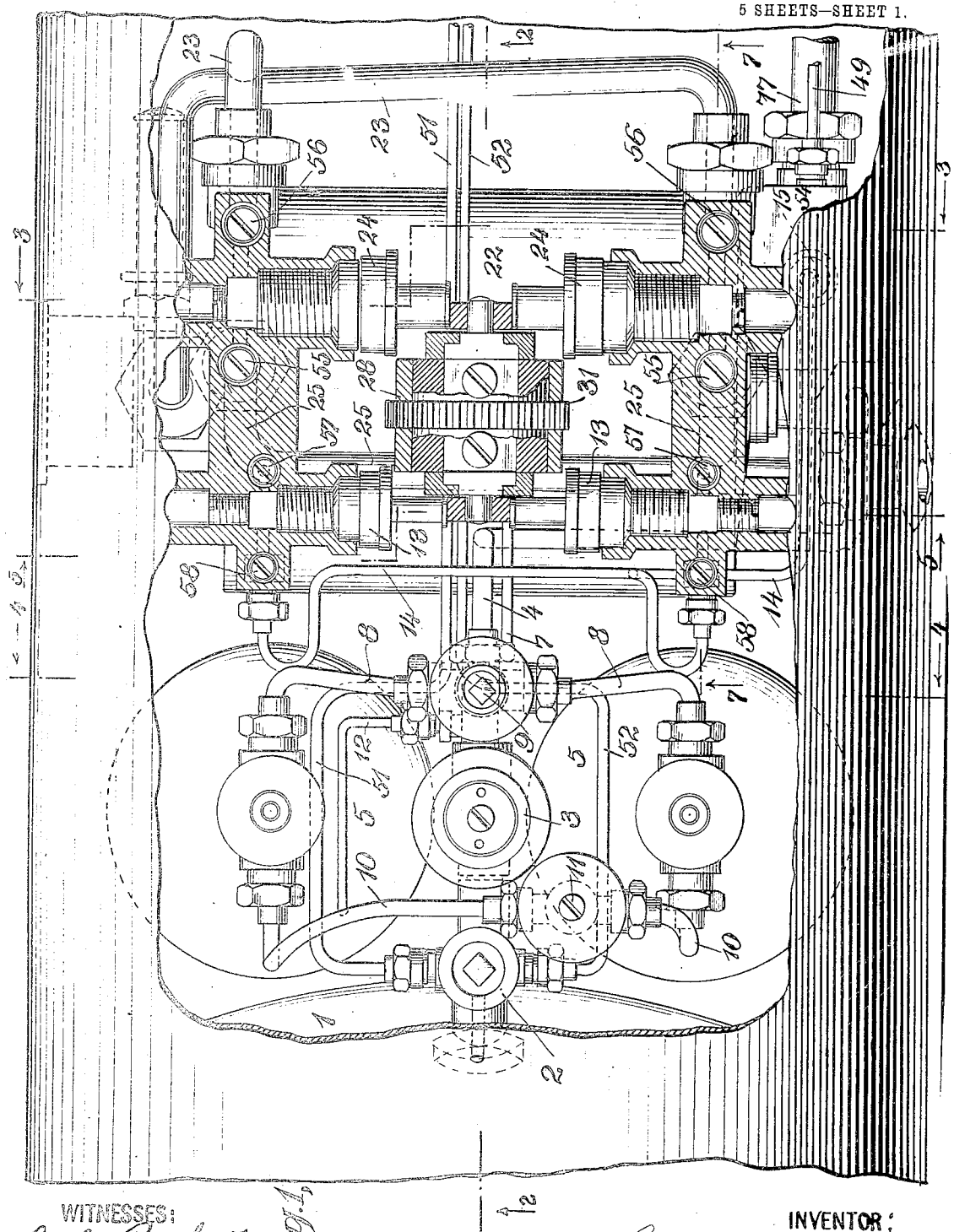
WITNESSES:
INVENTOR:
Gregory C. Davison,
BY
Lennie & Goldsborough
ATTORNEYS.

G. C. DAVISON.
AUTOMOBILE TORPEDO.
APPLICATION FILED MAR. 19, 1908. RENEWED JULY 3, 1912.
1,036,082.
Patented Aug. 20, 1912.
5 SHEETS—SHEET 2.
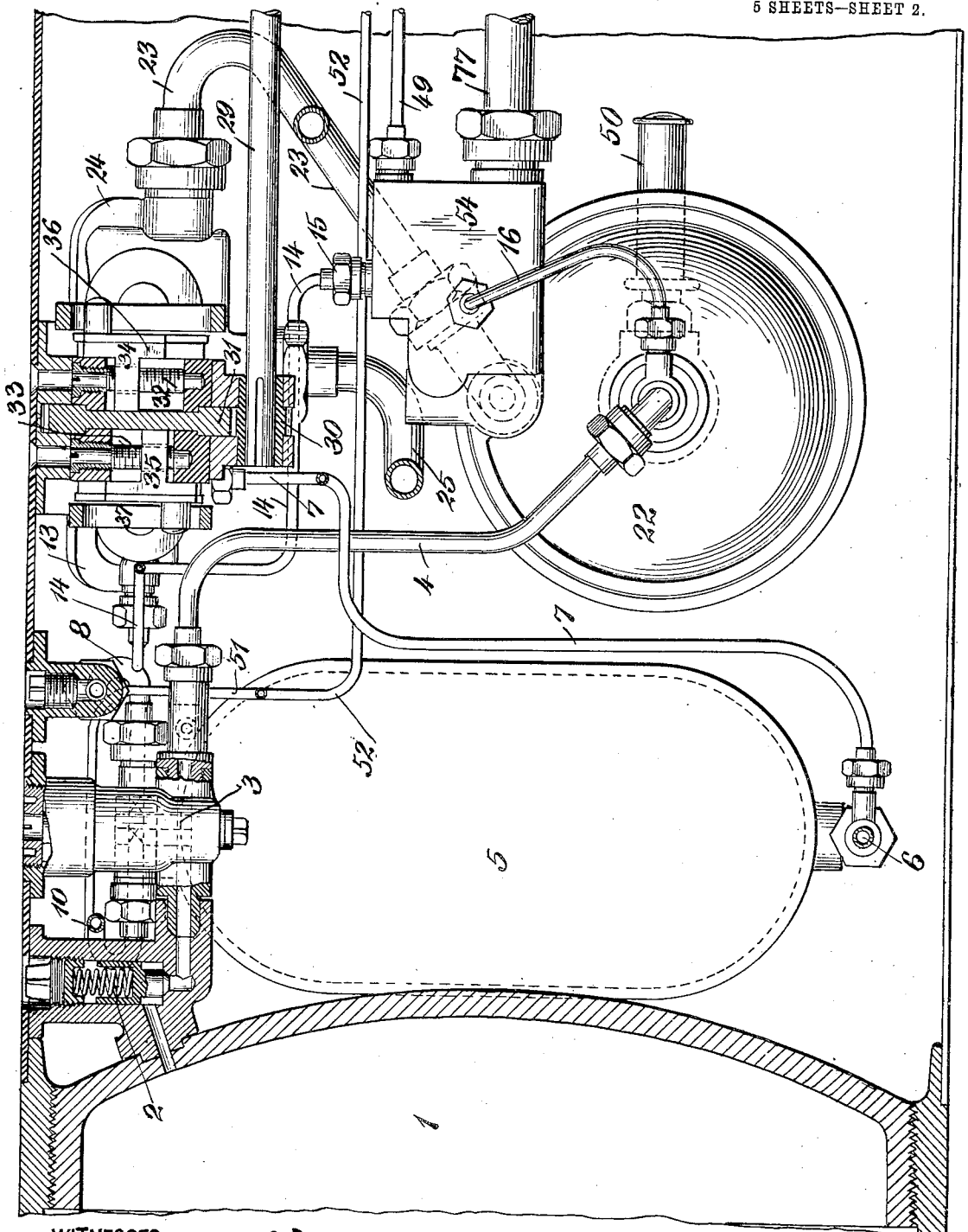

G. C. DAVISON.
AUTOMOBILE TORPEDO.
APPLICATION FILED MAR. 19, 1908. RENEWED JULY 3, 1912.
1,036,082.
Patented Aug. 20, 1912.
5 SHEETS—SHEET 3.
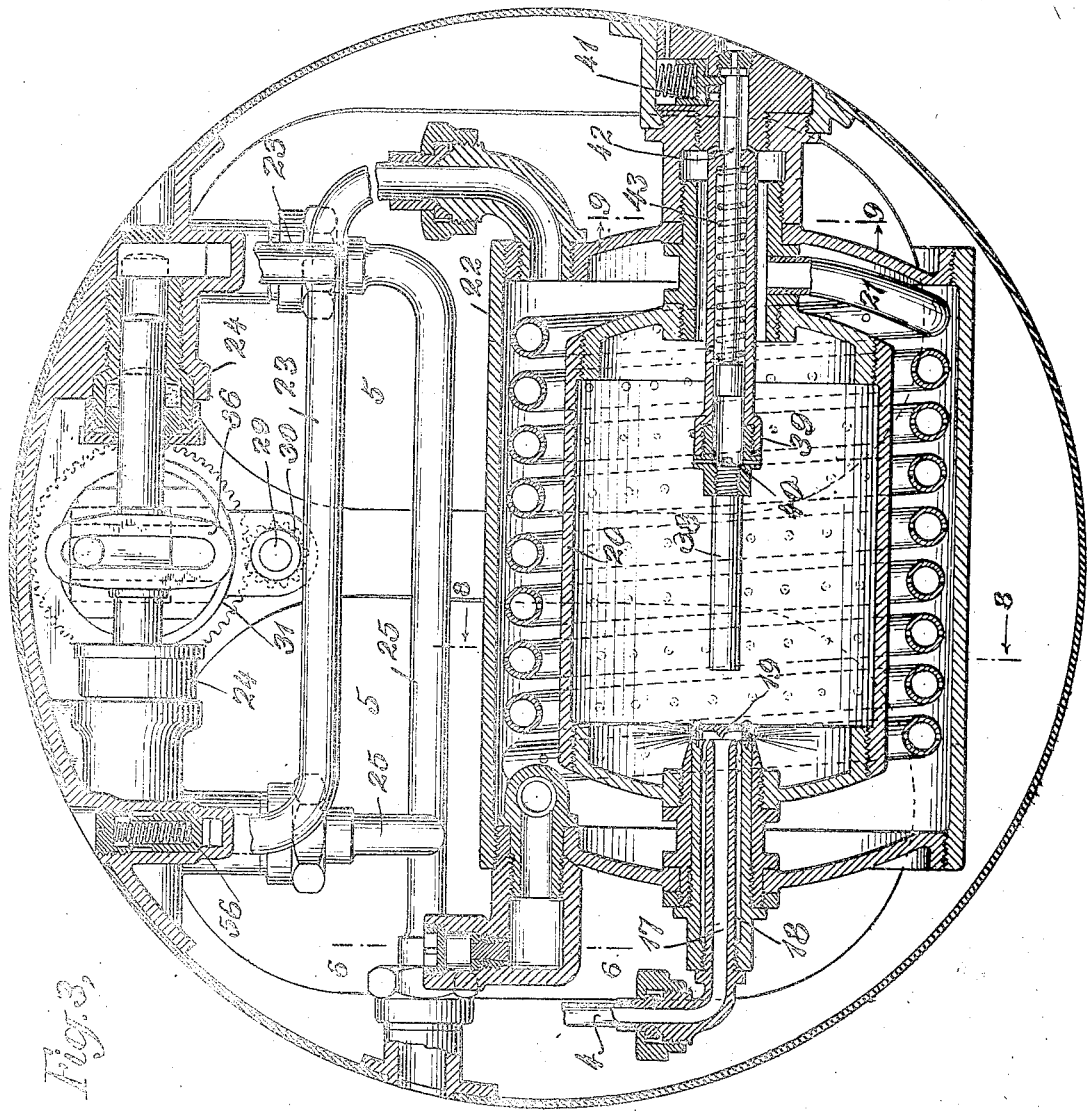
WITNESSES:
INVENTOR:
Gregory C. Davison,
BY
ATTORNEYS G. C. DAVISON.
AUTOMOBILE TORPEDO.
APPLICATION FILED MAR. 19, 1908. RENEWED JULY 3, 1912.
1,036,082.
Patented Aug. 20, 1912.
5 SHEETS—SHEET 4.
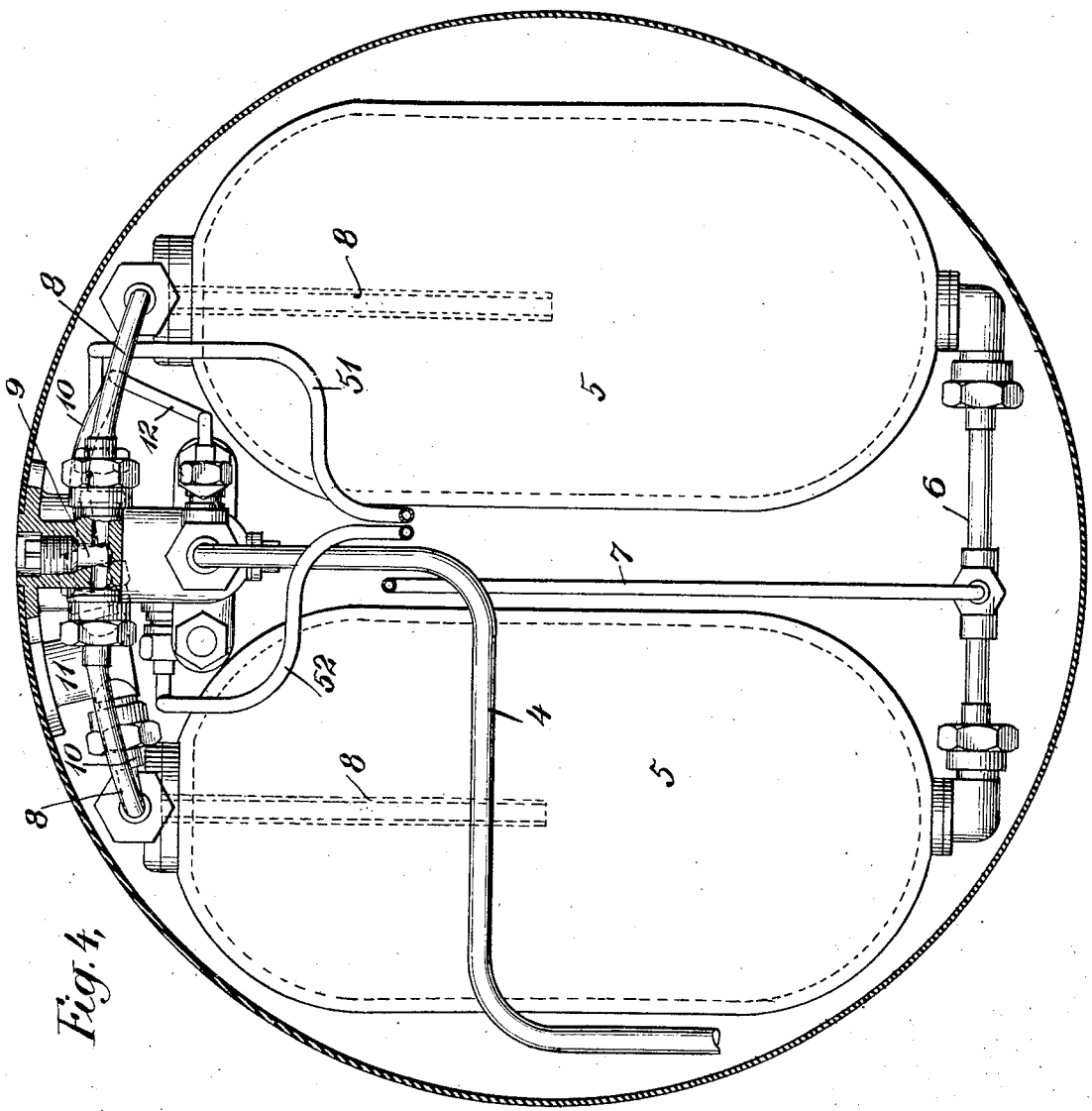
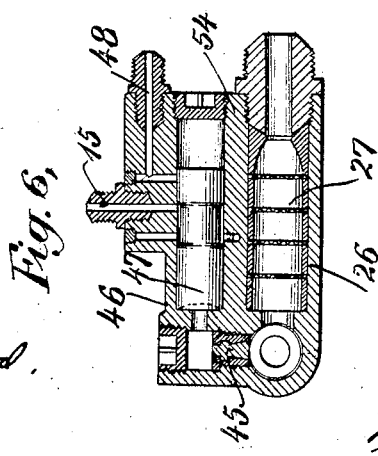
WITNESSES:
R. H. Barlow
L. B. Penfield
INVENTOR:
Gregory C. Davison,
BY
Pennie & Goldsborough
ATTORNEYS.

G. C. DAVISON.
AUTOMOBILE TORPEDO.
APPLICATION FILED MAR. 19, 1908. RENEWED JULY 3, 1912.
1,036,082.
Patented Aug. 20, 1912.
5 SHEETS—SHEET 5.
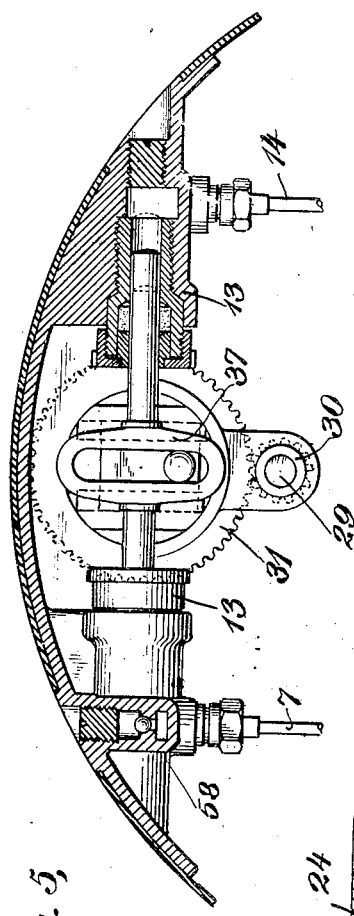
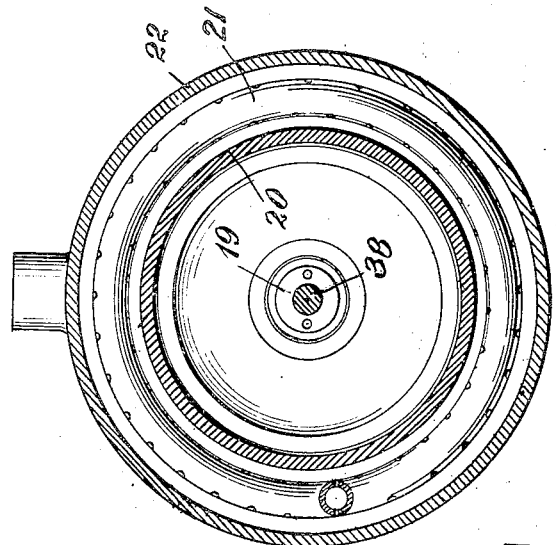
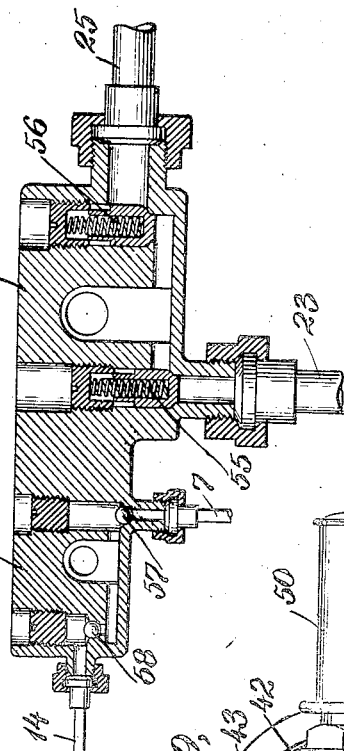
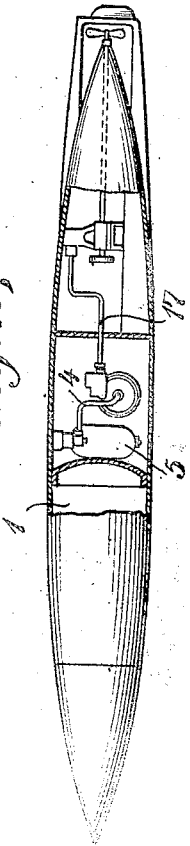
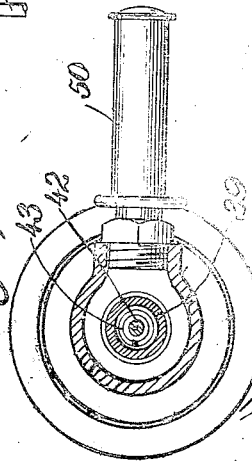
WITNESSES:
L. H. Barlow
L. B. Penfield
INVENTOR
Gregory C. Davison,
by
Lanning Goldsborough,
ATTORNEYS.

UNITED STATES PATENT OFFICE.

GREGORY CALDWELL DAVISON, OF QUINCY, MASSACHUSETTS, ASSIGNOR TO ELECTRIC BOAT COMPANY, OF NEW YORK, N. Y., A CORPORATION OF NEW JERSEY.

AUTOMOBILE TORPEDO.

1,036,082. Specification of Letters Patent. Patented Aug. 20, 1912.

Application filed March 19, 1908, Serial No. 422,175. Renewed July 3, 1912. Serial No. 707,606.

*To all whom it may concern:*

Be it known that I, GREGORY CALDWELL DAVISON, a citizen of the United States, residing at Quincy, in the county of Norfolk and State of Massachusetts, have invented certain new and useful Improvements in Automobile Torpedoes; and I do hereby declare the following to be a full, clear, and exact description of the invention, such as will enable others skilled in the art to which it appertains to make and use the same.

It has been common practice to propel automobile (or self-propelled) torpedoes by compressed air, which is fed from a storage reservoir to a suitable motor attached to the propeller shaft of the torpedo. It is of primary importance to reduce the size and weight of the parts in such torpedoes to the minimum, and to secure the maximum of energy from the motive power carried; because the available space is closely limited, and the range of the torpedo can only be added to by reducing the weight and increasing the efficiency of energy transformation. In order to increase the energy obtainable from the air carried in torpedoes propelled by compressed air, the air has sometimes been superheated before passing to the engine by burning in the air a certain amount of liquid fuel. But on account of the construction of the very light, high speed, powerful engines used in such torpedoes, the highest degree of heat theoretically obtainable is not practically available, since these engines must be operated at a moderate temperature. The result is that the fuel must be limited considerably below the amount which could combine with all the oxygen of the air in burning, and consequently the full efficiency of energy transformation is not secured.

The object of the present invention is to provide improved means whereby all the oxygen of the air may be used in combustion, or preferably, whereby compressed oxygen is carried instead of compressed air, and all of the oxygen is used for combustion; and then to overcome the objectionably high temperatures and preserve the released energy by providing means whereby the heat evolved by the combustion is utilized to form steam and the steam thus formed, with the cooled products of combustion, is delivered at the engine at a suitable temperature. By so doing, the total amount of work obtainable from the materials carried in the limited space of the torpedo will be largely increased, thereby largely increasing the range of the torpedo. It is further aimed to provide such means which admit of close regulation and safe control of the large forces employed; and to make it possible to continue the use of the light high speed powerful engines which are now used, and which require a very high working pressure and a moderate temperature.

The particular nature of the means employed will be understood from the following description and the accompanying drawings, in which there is described and illustrated the best form now known to me in which the invention may be embodied. The apparatus employed, however, is one which necessarily includes many known elements, and in which the different coöperating elements may assume many different equivalent forms.

In the drawings: Figure 1 is a top plan view of a portion of the torpedo, the shell being broken away to disclose the mechanism within it. Fig. 2 is a central longitudinal section on the line 2—2 of Fig. 1, with the generator and mixer in elevation. Fig. 3 is a cross section, on the line 3—3 of Fig. 1. Fig. 4 is a cross section on the line 4—4 of Fig. 1. Fig. 5 is a fragmentary cross section of the upper portion of the torpedo on the line 5—5 of Fig. 1, showing the fuel pump partly in section and partly in elevation. Fig. 6 is a longitudinal section (on the line 6—6 of Fig. 3) of the mixer and one of the safety devices. Fig. 7 is a fragmentary cross section on the line 7—7 of Fig. 1, showing the arrangement of valves of the fuel and water pumps. Fig. 8 is a cross section of the generator on the line 8—8 of Fig. 3. Fig. 9 is a cross section of one end of the generator on the line 9—9 of Fig. 1 showing another safety device, and Fig. 10 is an elevation partly in section and of a diagrammatic character, of the whole torpedo, showing the arrangement of the storage reservoirs, generator and engine in the torpedo.

The compressed air (or oxygen) is contained in a flask 1 formed by partitioning off a portion of the shell of the torpedo. From this flask the compressed air or oxygen is led to the generator through a starting valve 2, a reducing valve 3 and pipe 4.

The starting valve 2 is of known construction and is opened, upon launching the torpedo, by mechanical or other means, allowing the air (or oxygen) to pass through the reducing valve 3, which may be of any suitable construction and which reduces the air (or oxygen) to the working pressure. In the particular construction shown the starting valve is controlled through pipes 51 and 52 which extend to the ordinary tripping-latch cock (not shown). Up to this point the operation accords with the usual practice and no claims for novelty are made. The liquid fuel is carried in a suitable receptacle which in the form shown consists of two tanks 5 connected at their lower ends by an equalizing pipe 6 from which the fuel take-off pipe 7 leads. These flasks are provided with filling pipes 8 which branch from a filling orifice 9 closed by a screw-plug, when not in use. They are also provided with vent connections 10 extending to a vent orifice 11 which is also closed by a screw-plug when not in use. In filling, the vent and filling pipes are open; after filling they are closed. A connecting pipe 12 extends from the reduced air pressure to one of the branches of the vent pipes, thereby admitting the reduced air pressure to the flasks. The fuel take-off pipe 7 leads to one side of the fuel pump 13 and from the other side of that pump it is fed through the pipe 14 to the inlet 15 of the safety device in casing 54 (see Fig. 6) and through that device and the pipe 16 to the generator.

From Fig. 3 it will be seen that the air enters the burner of the generator through a tubular extension 17 of the pipe 4 which is surrounded by a chamber 18 with which the fuel supply pipe 16 communicates. The air or oxygen and the fuel, both under pressure, are forced through this tubular extension 17 and the surrounding space 18 against a cap 19 by which they are thrown out laterally in the form of a spray into the combustion chamber and are thoroughly mixed together. By means to be described later, the mixture of fuel and oxygen is ignited as soon as the torpedo is started. As the pressure in the combustion chamber is arranged to be four or five hundred pounds per square inch combustion will be very rapid. If pure oxygen be used instead of air, the resultant temperature would be very high. To withstand the high pressure the combustion chamber is made in the form of a strong cylinder 20. The intensely heated products of combustion pass from the combustion chamber through the open sleeve at the right hand end thereof (Fig. 3) into a strong perforated coil 21 which is within an outer casing 22 surrounding the combustion chamber. Water under pressure is supplied to this surrounding chamber through the water supply pipes 23 connected to the discharge orifices of the water pump 24 which is supplied from the external water through the pipes 25. This water is under sufficient pressure to be forced through the perforations in the pipe 21 against the pressure of the highly heated products of combustion therein, and the small streams of water flowing into the coil through the perforations mix with the heated gases, the water being converted into super-heated steam and the gases at the same time being cooled by the conversion. In other words, the water absorbs heat from the gases forming steam, so that the resultant mixture, while remaining at the working pressure, is of a lower temperature, and of greatly increased volume. The temperature of the steam and cooled gases will depend upon the proportion of oxygen, fuel and water used. From the coil 21 the gases pass into the mixer 26 (see Fig. 6) which comprises a chamber containing a series of gauze partitions 27. The object of the mixer is to heat up any drops of water which may be carried through the coil and cause them to form steam by contact with any strata of unduly heated gases which might get through the coil, and thus insure a uniform mixture at constant temperature being delivered at the engine through the pipe 77. It will be observed that the water in the outer chamber 22 serves to protect the combustion chamber from the heat inside, and also prevents the loss of heat by conduction, since such heat is absorbed by the water which subsequently passes into the coil to form steam.

The fuel pump 13 and the water pump 24 are both worked from the same yoke 28, carried to the main engine shaft 29, by the pinion 30 and the gear 31. Both of these pumps are of the single acting plunger type, with inlet check valves 55 and 57 and outlet check valves 56 and 58, and have an adjustable stroke provided by the adjusting screws 32 for the water pump and 33 for the fuel pump (see Fig. 2). It will be observed that by screwing in or out the screws 32 and 33 the distance at which the crank arms 34 and 35 are offset from the center is varied, thereby varying the extent of movement of the slotted yokes 36 and 37 and correspondingly varying the length of the pump stroke.

The ignition of the mixture of oxygen and fuel is accomplished, at starting, by means of the fuse 38 (see Fig. 3) in the carrier 39. The fuse is made of inflammable material such as cordite or smokeless powder and has on its end a percussion cap 40. When the torpedo is started and the air (or oxygen) under pressure enters the combustion chamber, the piston 41 is raised, the rod 42 is released, and is forced by the spring 43 in a direction to cause the striker 44 to explode the percussion cap and ignite the fuse, which thereupon starts the combustion of the mixed fuel and air or oxygen.

Safety devices are provided as follows:—
To prevent injury from undue heat, such as would ensue should the supply of water fail from any cause, a fusible plug 45 (see Fig. 6) is inserted in the circuit of mixed steam and cooled gases. Under normal circumstances the temperature to which this plug is exposed will be well below its melting point. But when very high temperatures are met with, as when no water is supplied, this plug will melt before any other part of the apparatus is injured. When the plug melts, the passage normally closed by it will be opened. This passage leads to a cylinder 46 containing a piston 47 which is cut away at the central portion to afford, when in the position shown in Fig. 6, a communication from the fuel inlet 15 to the outlet communicating with the fuel pipe 16, as previously described. It will thus be seen that in this position the piston allows a free passage for the fuel from the fuel pump to the burner. When the plug is melted, the piston moves under pressure to the right in Fig. 6, and closes the exit passage for the fuel and puts the inlet passage into communication with the outlet 48 which leads overboard through the pipe 49. This action shuts off the supply of fuel to the burner and stops combustion. When this happens the torpedo will continue to run, using only the compressed air or oxygen as motive power. On account of the timing of ignition, or from other causes, there may occur at times in the combustion chamber very high pressures. To prevent injury, by relieving such pressure, a safety valve 50 of any suitable construction is attached to the sleeve forming the outlet from the combustion chamber (see Fig. 9).

The operation may be briefly described as follows:—In preparing the torpedo for use the tanks 1 and 5 are filled with compressed air or oxygen and with fuel, respectively, and all the parts are properly adjusted. As the torpedo leaves the firing tube the starting valve is lifted and the air or oxygen passes through the reducing valve, the generator, and the plate 17 into the engine to start it. At the same time, the pressure of the air or oxygen ignites the fuse. After the first few strokes of the engine, fuel and water will begin to flow. The mixture of fuel and air (or oxygen) coming in contact with the burning fuse will ignite; and thereafter the highly heated products of combustion have their heat absorbed by the water flowing through the perforations in the pipe 14 and the mixture of cooled gases and steam passes to the engine to operate it. It will be observed that this arrangement affords a means of attaining the maximum amount of mechanical work from a given amount of compressed fuel and oxygen-carrying substance; and that at the same time it admits of safe control and accurate regulation of the large forces employed, and can be used with the very light high speed powerful engines now used in torpedoes, which engines require a very high working pressure and moderate temperature.

Many of the coöperating parts of the apparatus described above are such as may be replaced by a skilled mechanic by equivalent parts of many different forms and yet retain the advantageous mode of operation of the invention, and I do not intend to limit myself to the use of the particular forms of apparatus disclosed; intending on the contrary to retain the liberty of availing myself of all other equivalent arrangements in which the invention may be embodied.

What I claim is:—

1. An apparatus for generating motive fluid for automobile torpedoes, comprising a strong inner casing forming a combustion chamber capable of withstanding high pressure and having means for supplying a combustible and an oxygen-carrier to said chamber and for igniting them therein, in combination with an outer casing surrounding said inner casing, a coiled perforated pipe surrounding the inner casing within the outer casing and forming an exit passage for the products of combustion, and means for supplying water under pressure to the space between the inner and outer casings, whereby the water is forced in jets through the perforations into the products of combustion, and is converted into steam and mixed with the cooled gases; substantially as described.

2. In an apparatus for generating motive fluid for automobile torpedoes, a casing forming a combustion chamber and having means for supplying a combustible and an oxygen-carrier to said chamber in combination with a carrier supporting an ignition fuse having a percussion cap, a spring-actuated striker for said cap, a latch for restraining the striker, and mechanism actuated by pressure in the combustion chamber to release the latch and allow the striker to strike the percussion cap; substantially as described.

3. In an apparatus for generating motive fluid for automobile torpedoes, a casing 20 forming a combustion chamber and having a tubular inlet 17 for an oxygen carrier under pressure and a surrounding inlet 18 for a combustible under pressure, together with the deflecting plate 19 for throwing the mixed combustible and oxygen carrier into the combustion chamber in the form of a spray, a carrier 30 supporting an ignition fuse 38 having a percussion cap, a spring-actuated striker 44 normally restrained by a latch carried by a piston 41, the piston chamber being in communication with the combustion chamber, whereby pressure in the combustion chamber releases the striker, an outer casing 22 surrounding the casing 20, a perforated coiled pipe 21 in the space between the casing 22 and the casing 20 and forming an outlet from the combustion chamber, means for forcing water under pressure into the chamber between the two casings, whereby jets of water are forced through the perforations in the pipe 21 into the heated products of combustion from the combustion chamber to form steam and cool the products of combustion, a mixer in the path of the mixed steam and cooled gases, and a safety device also in the path of said gases operated by an excessively high temperature to shut off the supply of fuel to the generator; substantially as described.

4. A combined mixer and safety device for attachment to a generator of the character described comprising a casing 54 containing a chamber 26 in which gauze partitions 27 are supported, a fusible plug 45 normally closing a passage to a piston chamber 46 containing a piston 47 which controls the flow of fuel to the generator; substantially as described.

5. In an apparatus for generating motive fluid for automobile torpedoes, a casing forming a combustion chamber capable of withstanding high pressure and temperature and having means for supplying a combustible and an oxygen carrier to said chamber and for igniting them therein, a perforated extension of said chamber into which the hot products of combustion pass, a water jacket about said extension, and means for supplying water under pressure to said jacket, whereby the heated water in the water jacket is forced in jets through the perforations into the products of combustion, and is converted into steam and mixed with the cooled gases, substantially as described.

6. In an apparatus for generating motive fluid for automobile torpedoes, a casing forming a combustion chamber capable of withstanding high pressure and temperature and having means for supplying a combustible and an oxygen carrier to said chamber and for igniting them therein, a perforated extension of said chamber into which the hot products of combustion pass, a water jacket surrounding the combustion chamber and its extension, and means for supplying water under pressure to said jacket, whereby the heated water in the water jacket is forced in jets through the perforations into the products of combustion, and is converted into steam and mixed with the cooled gases, substantially as described.

In testimony whereof I affix my signature, in presence of two witnesses.

GREGORY CALDWELL DAVISON.

Witnesses:
F. L. BRAKE,
W. D. FESLER.

---

Copies of this patent may be obtained for five cents each, by addressing the "Commissioner of Patents, Washington, D. C."